(12) United States Patent
Song

(10) Patent No.: US 10,277,807 B2
(45) Date of Patent: *Apr. 30, 2019

(54) IMAGE DEVICE AND METHOD FOR MEMORY-TO-MEMORY IMAGE PROCESSING

(71) Applicant: SAMSUNG ELECTRONICS CO., LTD., Suwon-si (KR)

(72) Inventor: Yong-Bae Song, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,992

(22) Filed: Jun. 20, 2017

(65) Prior Publication Data

US 2017/0302850 A1   Oct. 19, 2017

Related U.S. Application Data

(63) Continuation of application No. 14/595,541, filed on Jan. 13, 2015, now Pat. No. 9,699,374.

(30) Foreign Application Priority Data

Jul. 15, 2014   (KR) .......................... 10-2014-0089139

(51) Int. Cl.
*H04N 5/232* (2006.01)
*H04N 1/21* (2006.01)
(Continued)

(52) U.S. Cl.
CPC ....... *H04N 5/23222* (2013.01); *H04N 1/2129* (2013.01); *H04N 1/2137* (2013.01);
(Continued)

(58) Field of Classification Search
CPC ............. H04N 5/23222; H04N 1/2129; H04N 1/2137; H04N 5/772; H04N 5/232; G08B 13/19676
See application file for complete search history.

(56) References Cited

U.S. PATENT DOCUMENTS 5,861,879 A   1/1999   Shimizu et al.
6,853,727 B1   2/2005   Foster et al.
(Continued)

FOREIGN PATENT DOCUMENTS

JP   2008-172410 A   7/2008
JP   2008-276508 A   11/2008
KR   10-1039406 B1   6/2011

*Primary Examiner* — Shahbaz Nazrul
(74) *Attorney, Agent, or Firm* — Sughrue Mion, PLLC

(57) ABSTRACT

Provided are an image device and method for operating the device. The image device includes a memory, a first image processor configured to receive image data that includes first and second sub-data, perform first image processing, and write a result of the first image processing to the memory, a second image processor configured to read the first and second sub-data, on which the first image processing has been performed, from the memory, and perform second image processing that is different from the first image processing, and a controller configured to control the second image processor to read the first sub-data, on which the first image processing has been performed, from the memory, before the second sub-data, on which the first image processing has been performed, is written in the memory, after the first sub-data, on which the first image processing has been performed, is written in the memory.

17 Claims, 17 Drawing Sheets

(51) Int. Cl.
*H04N 5/77* (2006.01)
*G08B 13/196* (2006.01)

(52) U.S. Cl.
CPC ............ *H04N 5/232* (2013.01); *H04N 5/772* (2013.01); *G08B 13/19676* (2013.01)

(56) References Cited

U.S. PATENT DOCUMENTS

| | | |
|---|---|---|
| 7,545,416 B2 | 6/2009 | Shimazu et al. |
| 7,916,185 B2 | 3/2011 | Hatano et al. |
| 8,054,357 B2 | 11/2011 | Tay |
| 8,194,090 B2 | 6/2012 | Sato |
| 8,547,453 B2 | 10/2013 | Mabuchi et al. |
| 8,854,488 B2 | 10/2014 | Shiomi |
| 2002/0039143 A1 | 4/2002 | Sasaki |
| 2002/0118894 A1 | 8/2002 | Morimoto et al. |
| 2005/0285871 A1 | 12/2005 | Tsujiguchi |
| 2008/0043145 A1 | 2/2008 | Someya et al. |
| 2008/0316331 A1 | 12/2008 | Jun |
| 2009/0256932 A1 | 10/2009 | Morimoto |
| 2012/0054229 A1 | 3/2012 | Nomura et al. |
| 2012/0098987 A1 | 4/2012 | Tsuda |
| 2012/0236015 A1 | 9/2012 | Song |

| PG1 | PG2 | PG3 | PG4 | PG5 | PG6 | PG7 | PG8 | PG9 | PG10 |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

1200

1300

1400

IMAGE DEVICE AND METHOD FOR MEMORY-TO-MEMORY IMAGE PROCESSING

CROSS-REFERENCE TO THE RELATED APPLICATION

This is a continuation of U.S. application Ser. No. 14/595,541 filed Jan. 13, 2015, which is based on and claims priority from Korean Patent Application No. 10-2014-0089139, filed on Jul. 15, 2014 in the Korean Intellectual Property Office, the disclosure of which is incorporated herein in its entirety by reference.

BACKGROUND

1. Field

Apparatuses and methods consistent with exemplary embodiments relate to an image device.

2. Description of the Prior Art

As the development of electronic technology continues, it is required to improve an operation speed of an image device. Specifically, if the operation speed of the image device is not improved whereas an operating speed of a central processing unit becomes higher, inefficiency may be caused in processing image data. Accordingly, many studies have been made to improve the operation speed of the image device.

SUMMARY

One subject to be addressed by exemplary embodiments of the inventive concept is to provide an image device having an improved operation speed.

Another subject to be addressed by the exemplary embodiments of the inventive concept is to provide a method for driving an image device having an improved operation speed.

Various advantages, aspects, and features of the inventive concept will be set forth in part in the description which follows and in part will become apparent to those having ordinary skill in the art upon examination of the following or may be learned from practice of the inventive concept.

According to an aspect of an exemplary embodiment, there is provided an image device which may include: a memory, a first image processor configured to receive image data that includes first and second sub-data, to perform first image processing, and write the result of the first image processing to the memory, a second image processor configured to read the first and second sub-data, on which the first image processing has been performed, from the memory, and perform second image processing that is different from the first image processing, and a controller configured to control the second image processor to read the first sub-data, on which the first image processing has been performed, from the memory, before the second sub-data, of which the first image processing has been performed, is written in the memory, after the first sub-data, on which the first image processing has been performed, is written in the memory.

According to an aspect of another exemplary embodiment, there is provided an image device which may include: a memory, an image sensor configured to sense an image, a first image processor configured to receive the sensed image, and perform first image processing with respect to a part of the received image, and write a result of the first image processing in the memory, a second image processor configured to receive the result written in the memory and perform second image processing that is different from the first image processing while the first image processor performs the first image processing with respect to a remaining part of the sensed image, and an output module configured to output a result of the second image processing.

According to an aspect of still another exemplary embodiment, there is provided a method for operating an image device. The method may include: providing image data that includes first and second sub-data, performing first image processing with respect to the first sub-data, writing the first sub-data, on which the first image processing has been performed, in a memory, and performing second image processing that is different from the first image processing through reading of the first sub-data, on which the first image processing has been performed, from the memory while the first image processing is performed with respect to the second sub-data.

BRIEF DESCRIPTION OF THE DRAWINGS

The above and other objects, features and advantages of the inventive concept will be more apparent from the following detailed description taken in conjunction with the accompanying drawings, in which:

FIG. 3 is a diagram explaining image data of the image device illustrated in FIG. 1, according to an exemplary embodiment;

DETAILED DESCRIPTION OF THE EXEMPLARY EMBODIMENTS

Figure 1:
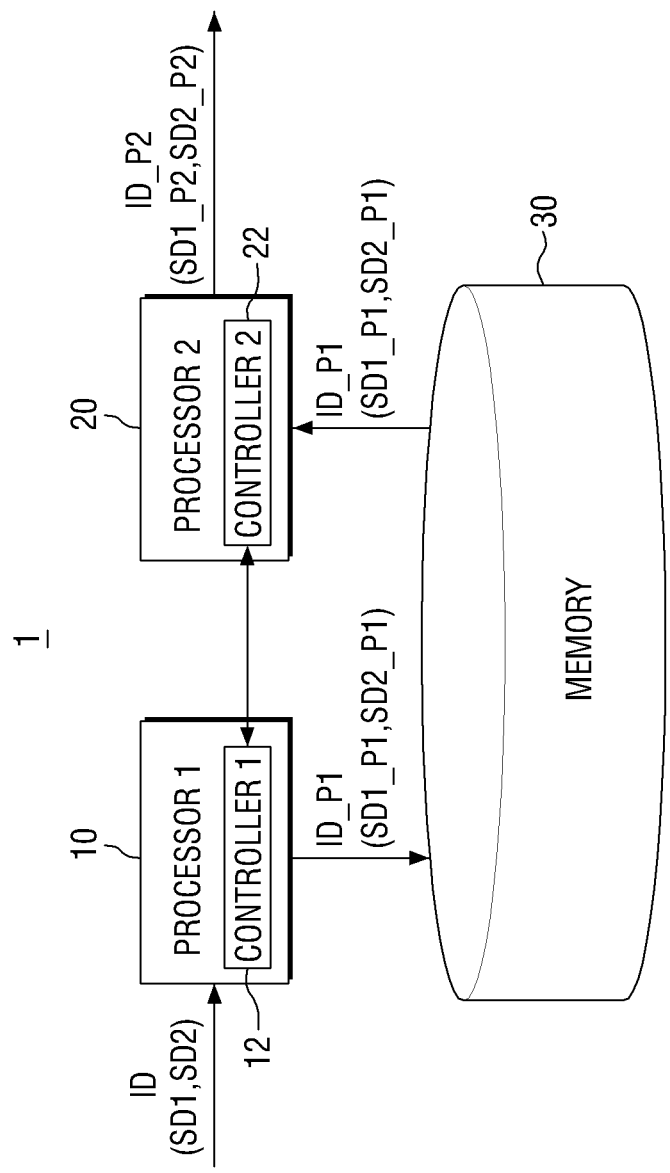
FIG. 1 is a block diagram of an image device according to an exemplary embodiment.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

Figure 2:
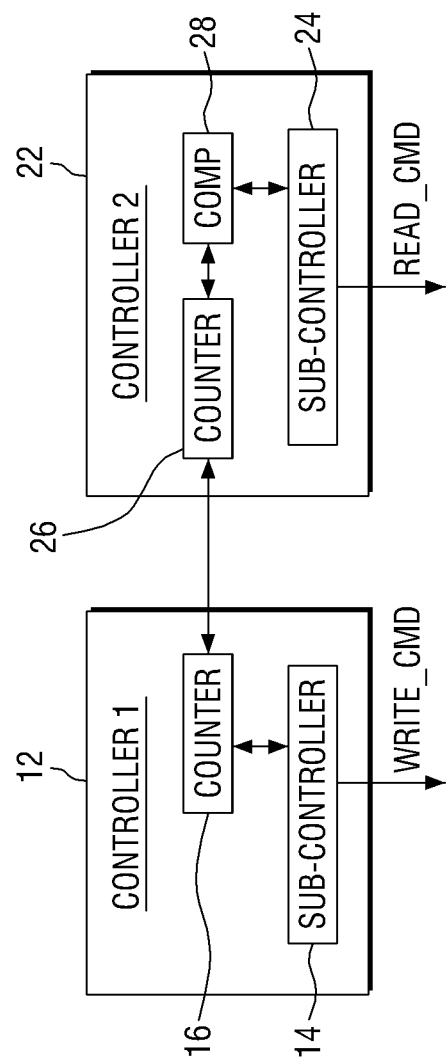
FIG. 2 is a detailed block diagram of a controller in the image device illustrated in FIG. 1, according to an exemplary embodiment.
Figure 3:
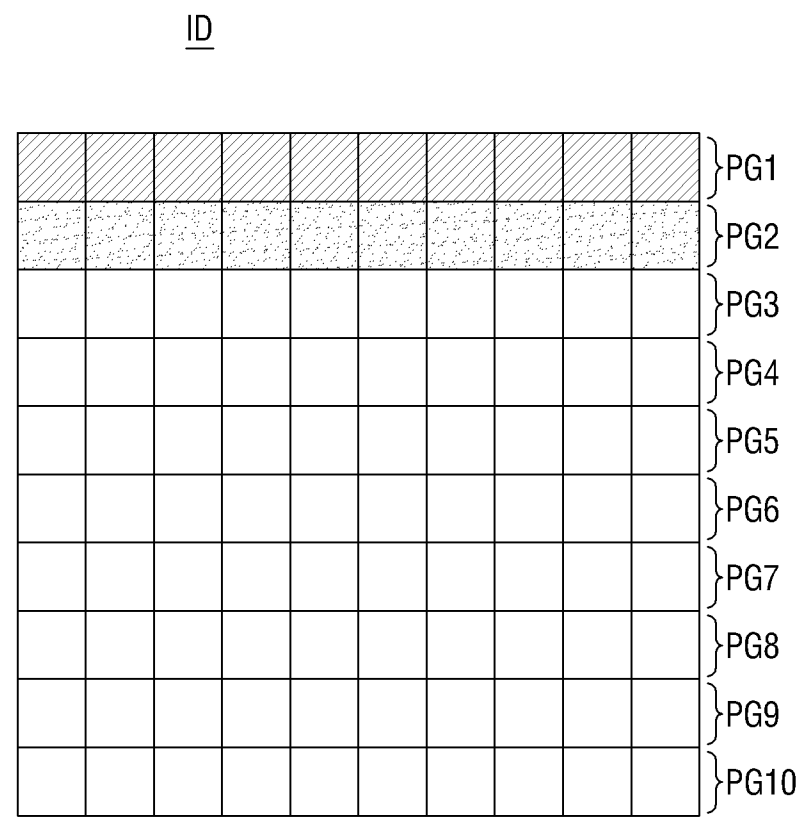

Referring to FIGS. 1 to 3, an image device according to an exemplary embodiment will be described.

FIG. 1 is a block diagram of an image device according to an exemplary embodiment, and FIG. 2 is a detailed block diagram of a controller in the image device illustrated in FIG. 1. FIG. 3 is a diagram explaining image data of the image device illustrated in FIG. 1.

Referring to FIG. 1, an image device 1 includes a memory 30, a first image processor 10, and a second image processor 20.

The memory 30 may include, for example, a volatile memory. An example of such a volatile memory may be a dynamic random access memory (DRAM), but is not limited thereto.

In some exemplary embodiments, the memory 30 may be, for example, a nonvolatile memory. An example of such a nonvolatile memory may be a NAND flash, NOR flash, magnetoresistive random access memory (MRAM), parallel random access memory (PRAM), or resistive random access memory (RRAM), but is not limited thereto.

In some other exemplary embodiments, the memory 30 may be replaced by a hard disk drive or a magnetic storage device according to circumstances.

The first image processor 10 may receive image data ID that is input thereto. The image data ID may be divided into several sub-data. For example, in this embodiment, the image data ID may include first and second sub-data SD1 and SD2.

In some exemplary embodiments, the first sub-data may include first pixel group data of the image data ID, and the second sub-data may include second pixel group data that is different from the first pixel group data of the image data ID.

Hereinafter, referring to FIG. 3, this will be described in more detail.

Referring to FIG. 3, the image data ID may include a plurality of pixel group data PG1 to PG10.

For convenience in explanation, FIG. 3 exemplarily illustrates that the image data ID that is sensed as one frame corresponds to 10×10 pixels, but is not limited thereto.

In some exemplary embodiments, the first sub-data SD1 (in FIG. 1) may include pixel group data PG1 arranged in a first row of the image data ID, and the second sub-data SD2 (in FIG. 1) may include pixel group data PG2 that is arranged in a second row that is disposed below the first row.

Further, in some exemplary embodiments, the first sub-data SD1 (in FIG. 1) may include pixel group data PG1 and PG2 arranged in the first and second rows of the image data ID, and the second sub-data SD2 (in FIG. 1) may include pixel group data PG3 and PG4 arranged in third and fourth rows that are disposed below the first and second rows.

In some exemplary embodiments, the first sub-data SD1 (in FIG. 1) may include pixel group data PG1 to PG5 arranged in the first to fifth rows of the image data ID, and the second sub-data SD2 (in FIG. 1) may include pixel group data PG6 to PG10 arranged in sixth to tenth rows that are disposed below the first and fifth rows.

In the present embodiment, the first and second sub-data SD1 and SD2 (in FIG. 1) are sub-data that constitute the image data ID, and a method for discriminating the first and second sub-data SD1 and SD2 (in FIG. 1) from the image data ID may be variously modified and embodied as necessary.

Referring again to FIG. 1, the first image processor 10 may receive the image data ID that includes the first and second sub-data SD1 and SD2, perform first image processing, and write a result of the image processing in the memory 30.

Specifically, the first image processor 10 may first perform first image processing with respect to the first sub-data SD1, write a result of this image processing in the memory, perform first image processing with respect to the second sub-data SD2, and then write a result of this image processing in the memory 30. In other words, the first sub-data SD1 may be processed prior to the second sub-data SD2 when the first image processing is performed on the first and second sub-data SD1 and SD2.

In the present embodiment, a first controller 12 may be arranged in the first image processor 10 to control such an operation of the first image processor 10 including the first image processing.

Specifically, if the first image processing is completed with respect to the first sub-data SD1, the first controller 12 may provide a write command to the memory 30 to write the first sub-data SD1_P1 on which the first image processing has been performed, and if the first image processing is completed with respect to the second sub-data SD2, the first controller 12 may provide a write command to the memory 30 to write the second sub-data SD2_P1 on which the first image processing has been performed.

The second image processor 20 may read the image data ID_P1, on which the first image processing has been performed, from the memory 30 and perform the second image processing that is different from the first image processing that is performed by the first image processor 10.

Specifically, the second image processor 20 may first perform the second image processing through reading of the first sub-data SD1_P1, on which the first image processing has been performed, from the memory 30, and then perform the second image processing through reading of the second sub-data SD2_P1, on which the first image processing has been performed, from the memory 30. Here, the first sub-data SD1_P1, on which the first image processing has been performed, may be processed prior to the second sub-data SD2_P1 on which the first image processing has been performed when the second image processing is performed.

In this embodiment, the second controller 22 may be arranged in the second image processor 20 to control such an operation of the second image processor 20 including the second image processing.

Specifically, if the first sub-data SD1_P1, on which the first image processing has been performed, is written in the memory 30, the second controller 22 may provide a read command to the memory 30 to read the first sub-data SD1_P1 on which the first image processing has been performed, and if the second sub-data SD2_P1, on which the first image processing has been performed, is written in the memory 30, the second controller 22 may provide a read command to the memory 30 to read the second sub-data SD2_P1 on which the first image processing has been performed.

In accordance with the operations of the first and second controllers 12 and 22 as described above, the image device 1 according to this embodiment may enable the second image processor 20 to read the first sub-data SD1_P1, on which the first image processing has been performed, from the memory 30 to perform the second image processing before the second sub-data SD2_P1, on which the first image processing has been performed, is written in the memory 30 after the first sub-data SD1_P1, on which the first image processing has been performed, is written in the memory 30. The detailed explanation thereof will be made while the operation of the image device according to this embodiment is explained.

Referring to FIGS. 1 and 2, in some exemplary embodiments, the first controller 12 may include a first sub-controller 14 and a first counter 16, and the second controller 22 may include a second sub-controller 24, a second counter 26 and a comparator 28.

If the first image processing is completed with respect to the first sub-data SD1, the first controller 14 may apply a write command WRITE_CMD to the memory 30 in order to write the first sub-data SD1 in the memory 30. Further, the first controller 14 may increase a count value of the first counter 16 after applying the write command WRITE_CMD to the memory 30.

The second counter 26 may be connected to the first counter 16. Accordingly, a count value of the second counter 26 may be equally increased when the count value of the first counter 16 is increased.

The comparator 28 may compare the count value of the second counter 26 with a predetermined value, and if the values coincide with each other, the comparator 28 may provide a predetermined output signal to the second controller 24. The second controller 24 may receive the output signal from the comparator 28 and apply a read command READ_CMD to the memory 30.

In this embodiment, the first counter 16 may serve as a recorder that records a time point when the first sub-data SD1_P1, on which the first image processing has been performed, is written in the memory 30, and the second counter 26 and the comparator 28 may serve as a sensor that senses the time point when the first sub-data SD1_P1, on which the first image processing has been performed, is written in the memory 30.

As described above, it is exemplified that the recorder and the sensor are implemented as the counter and the comparator, but this embodiment is not limited to such examples. If needed, the configuration of the recorder and the sensor may be differently modified without limit. For example, the recorder and the sensor may be configured as one single component.

Further, it is exemplified that the controller that controls the operation of the first and second image processors 10 and 20 is separated into the first and second controllers 12 and 22 to be arranged in the first and second image processors 10 and 20, respectively, but this embodiment is not limited to such a configuration. If needed, the configuration of the controller that controls the operation of the first and second image processors 10 and 20 may be differently modified without limit. For example, the first and second controllers 12 and 22 may be configured as one single component or controller, and further, the first and second image processors 10 and 20 may also be configured as one single image processor.

Hereinafter, referring to FIGS. 1 to 4, operations of an image device according to exemplary embodiments will be described.

Figure 4:
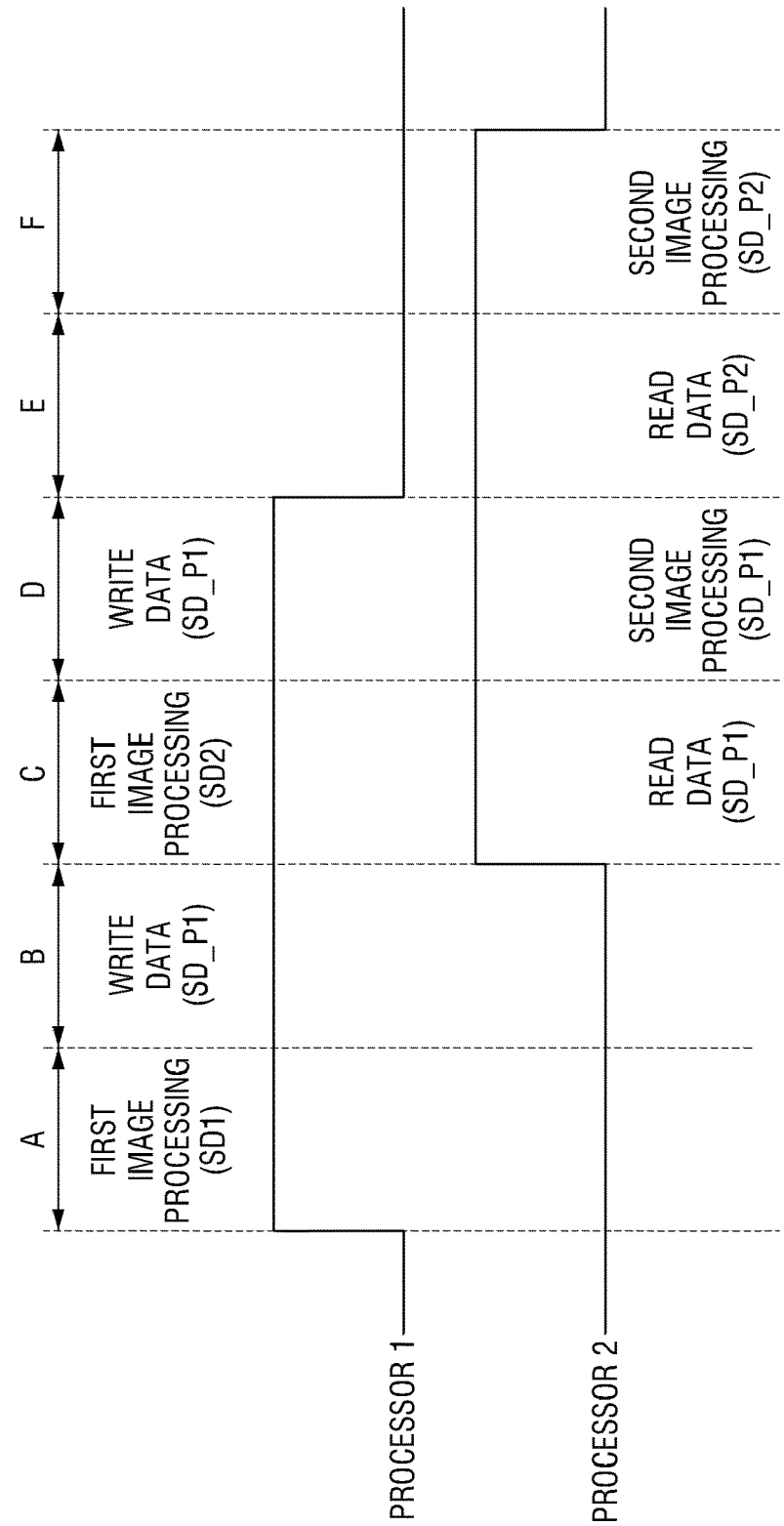
FIG. 4 is a timing diagram explaining the operation of the image device illustrated in FIG. 1, according to an exemplary embodiment.

FIG. 4 is a timing diagram explaining the operation of the image device illustrated in FIG. 1.

Referring to FIG. 4, the first image processing is performed with respect to the first sub-data SD1 that is input through activation of the first image processor 10 (section A). In this case, as illustrated, the second image processor 20 is not activated.

Once the first image processing is completed with respect to the first sub-data SD1, the first sub-data SD1_P1, on which the first image processing has been performed, is written in the memory 30 (section B).

Specifically, once the first image processing is completed with respect to the first sub-data SD1, the first sub-controller 14 applies a write command WRITE_CMD to the memory 30 to write the first sub-data SD1_P1, on which the first image processing has been performed, in the memory 30. Further, the first sub-controller 14 increases the count value of the first counter 16 by one (e.g., increase from "0" to "1").

Next, the first image processor 10 performs the first image processing with respect to the second sub-data SD2 provided thereto. At this time, the second image processor 20 reads the first sub-data SD1_P1 that is written in the memory 30 (section C).

Specifically, if the count value of the first counter 16 is increased by one, the count value of the second counter 26 is also increased by one (e.g., increase from "0" to "1"). In a state where the count value of the second counter 26 is "0", the comparator 28 does not generate an output signal. However, if the count value of the second counter 26 is increased to "1", the comparator 28 generates and provides a predetermined output signal to the second sub-controller 24. The second sub-controller 24, which has received the output signal from the comparator 28, applies a read command READ_CMD for reading the first sub-data SD1_P1, on which the first image processing has been performed, to the memory 30.

Next, once the first image processing is completed with respect to the second sub-data SD2, the second sub-data SD1_P2, on which the first image processing has been performed, is written in the memory 30. At this time, the second image processor 20 performs the second image processing with respect to the first sub-data SD1_P1, on which the first image processing has been performed, to output the first sub-data SD1_P2 on which the second image processing has been performed (section D).

Specifically, once the first image processing is completed with respect to the second sub-data SD2, the first controller 14 applies a write command WRITE_CMD to the memory 30 to write the second sub-data SD2_P1, on which the first image processing has been performed, in the memory 30. Further, the first sub-controller 14 increases the count value of the first counter 16 by one (e.g., increase from "1" to "2").

Next, the first image processor 10 is inactivated since the first image processing has completely been performed with respect to the provided image data ID. Then, the second image processor 20 reads the second sub-data SD2_P1 that is written in the memory 30 (section E).

Specifically, if the count value of the first counter 16 is increased by one, the count value of the second counter 26 is also increased by one (e.g., increase from "1" to "2"). Accordingly, the comparator 28 generates and provides a predetermined output signal to the second sub-controller 24. The second sub-controller 24, which has received the output signal from the comparator 28, applies a read command READ_CMD for reading the second sub-data SD2_P1, on which the first image processing has been performed, to the memory 30.

Next, the second image processor 20 performs the second image processing with respect to the second sub-data SD2_P1, on which the first image processing has been performed, outputs the second sub-data SD2_P2, on which the second image processing has been performed, and then becomes inactivated (section F).

As described above, the first image processor 10 and the second image processor 20 of the image device 1 according to this embodiment perform the image processing in a memory-to-memory (MTM) method, and thus the image processing speed can be improved.

The MTM method, in which the image processing is performed using a memory, has high reliability in performing the image processing, but has low operation speed as compared with an on-the-fly (OTF) method.

However, as in this embodiment, if a subsequent work starts immediately through immediate sensing of a time point when a preceding work is completed with respect to a part of provided image data, it is not necessary to wait until the preceding work is completed, and thus image processing speed can be further improved. For example, in the image device 1 according to this embodiment, latency can be improved as long as the section C and the section D shown in FIG. 3.

Next, referring to FIG. 5, an image device according to another exemplary embodiment will be described.

Figure 5:
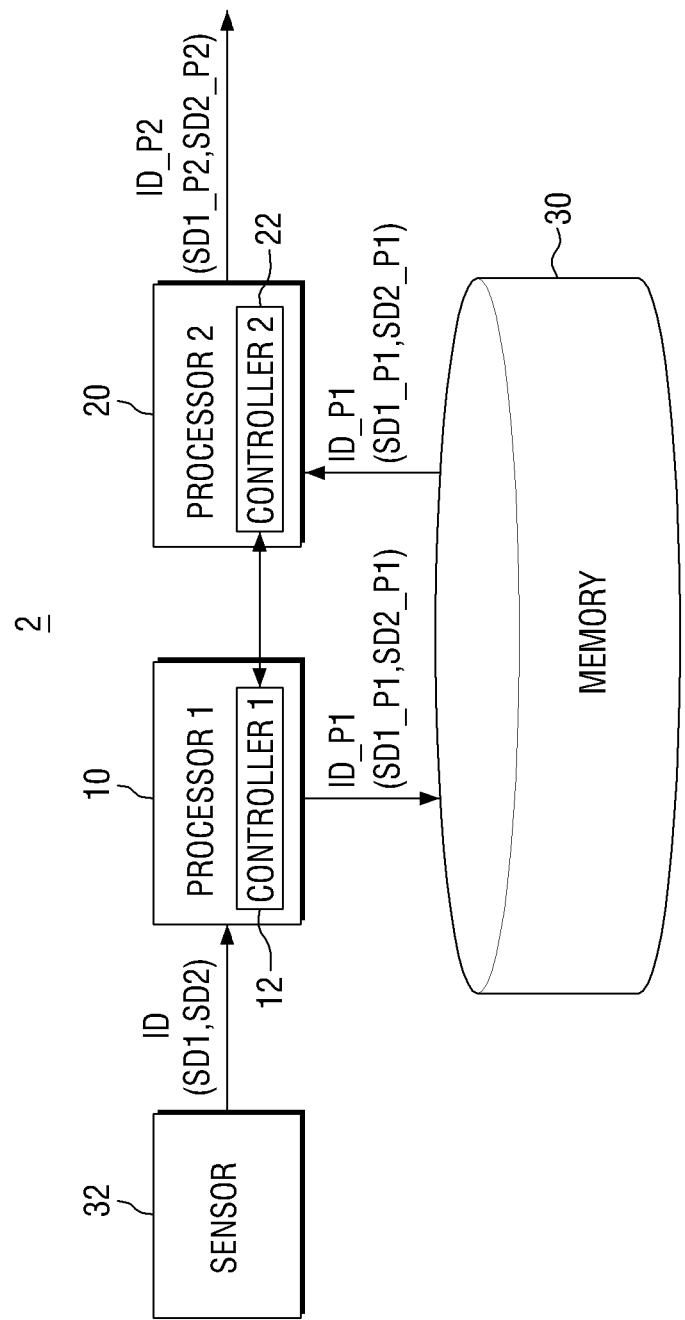
FIG. 5 is a block diagram of an image device according to another exemplary embodiment.

FIG. 5 is a block diagram of an image device according to another exemplary embodiment. Hereinafter, duplicate explanation of the above-described embodiment will be omitted, and explanation will be made around different points between this embodiment and the above-described embodiment.

Referring to FIG. 5, an image device 2 according to this embodiment may further include an image sensor 32.

The image sensor 32 may sense an image of an object and generate image data ID. In this case, the first sub-data SD1 may be data of an n-th (where, n is a natural number) column pixel group of the sensed image data ID, and the second sub-data SD2 may be data of an (n+1)-th column pixel group of the sensed image data ID.

An example of the image sensor 32 may be, for example, a camera module. The detailed configuration of the image sensor 32 will be described later with reference to FIG. 12.

Next, referring to FIG. 6, an image device according to still another exemplary embodiment will be described.

Figure 6:
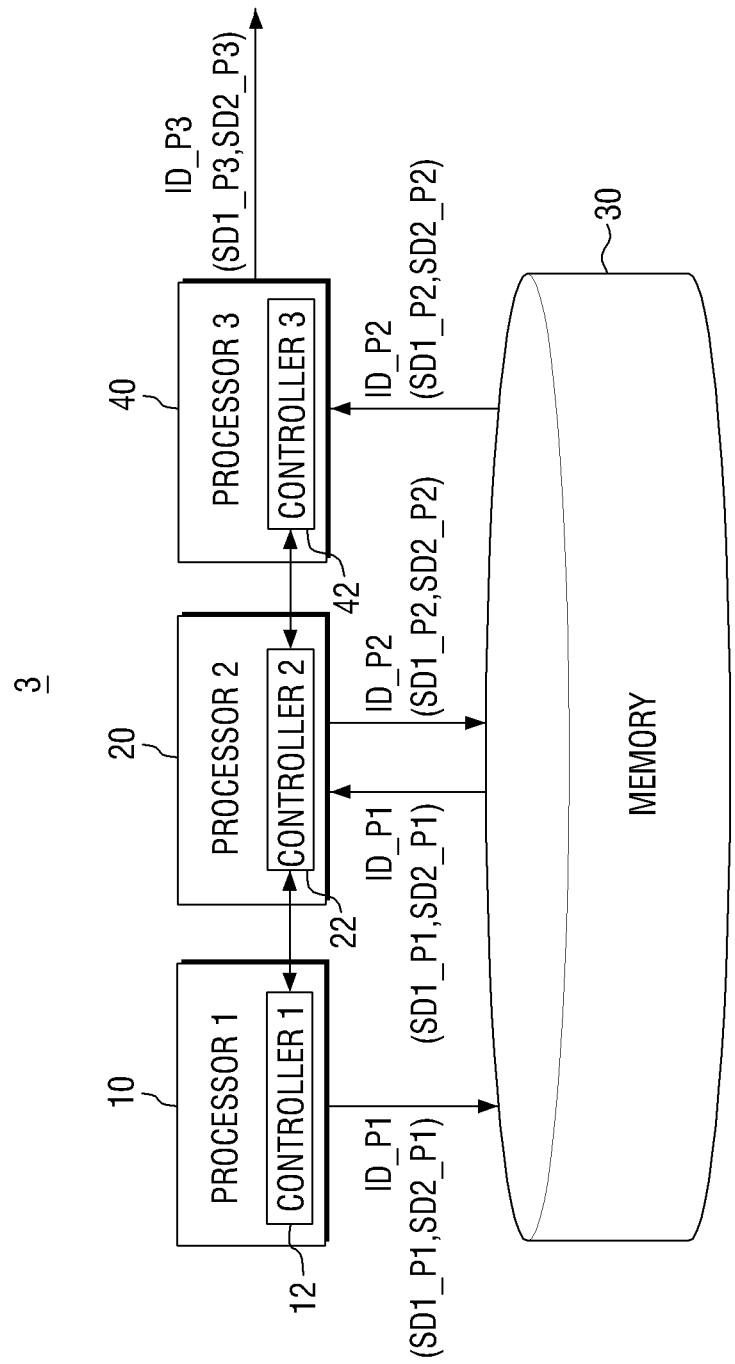
FIG. 6 is a block diagram of an image device according to still another exemplary embodiment.

FIG. 6 is a block diagram of an image device according to still another exemplary embodiment. Hereinafter, duplicate explanation of the above-described embodiments will be omitted, and explanation will be made around different points between this embodiment and the above-described embodiments.

Referring to FIG. 6, an image device 3 according to this embodiment may further include a third image processor 40.

The second image processor 20 may read first and second sub-data SD1_P1 and SD2_P1, on which first image processing has been performed, from the memory 30, perform second image processing with respect to read data, and then write a result of the second image processing in the memory 30.

Specifically, once the second image processing is completed with respect to the first sub-data SD1_P1, on which the first image processing has been performed, the second controller 22 may provide a write command to the memory 30 to write the first sub-data SD1_P2, on which the second image processing has been performed, and once the second image processing is completed with respect to the second sub-data SD2_P1, on which the first image processing has been performed, the second controller 22 may provide the write command to the memory 30 to write the second sub-data SD2_P2 on which the second image processing has been performed.

The third image processor 40 may perform third image processing that is different from the second image processing performed by the second image processor 20 through reading of the image data ID_P2, on which the second image processing has been performed, from the memory 30.

Specifically, the third image processor 40 may first read the first sub-data SD1_P2, on which the second image processing has been performed, from the memory 30 to perform the third image processing with respect to the read data, and then read the second sub-data SD2_P2, on which the second image processing has been performed, from the memory 30 to perform the third image processing with respect to the read data. Here, when the third image processing is performed, the first sub-data SD1_P2, on which the second image processing has been performed, may be processed prior to the second sub-data SD2_P2 on which the second image processing has been performed.

In this embodiment, a third controller 42 may be arranged in the third image processor 40 to control an operation of the third image processor 40 including the third image processing.

Specifically, if the first sub-data SD1_P2, on which the second image processing has been performed, is written in the memory 30, the third controller 42 may read the first sub-data SD1_P2, on which the second image processing has been performed, through outputting a read command to the memory 30, while if the second sub-data SD2_P2, on which the second image processing has been performed, is written in the memory 30, the third controller 42 may provide a read command to the memory 30 to read the second sub-data SD2_P2 on which the second image processing has been performed.

In accordance with the operations of the first to third controllers 12, 22, and 42, the image device 3 according to this embodiment may enable the second image processor 20 to read the first sub-data SD1_P1, on which the first image processing has been performed, from the memory 30 to perform the second image processing before the second sub-data SD2_P1, on which the first image processing has been performed, is written in the memory 30 after the first sub-data SD1_P1, on which the first image processing has been performed, is written in the memory 30. Further, the image device 3 according to this embodiment may enable the third image processor 40 to read the first sub-data SD1_P2, on which the second image processing has been performed, from the memory 30 to perform the third image processing before the second sub-data SD2_P1, on which the second image processing has been performed, is written in the memory 30 after the first sub-data SD1_P2, on which the second image processing has been performed, is written in the memory 30.

The third controller 42 may have, for example, a configuration that is similar to the configuration of the second controller 22 (in FIG. 2) as described above. Since this has been fully explained, duplicate explanation thereof will be omitted.

Next, referring to FIG. 7, an image device according to still another exemplary embodiment will be described.

Figure 7:
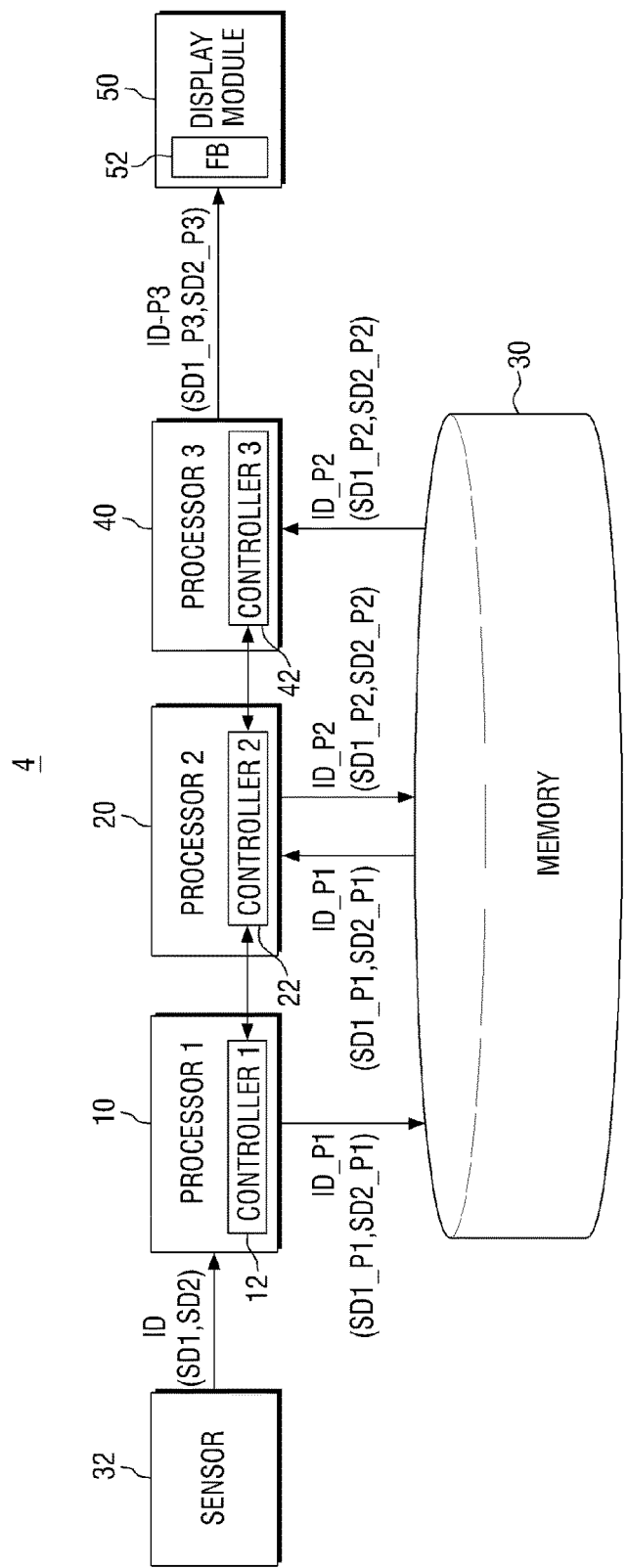
FIG. 7 is a block diagram of an image device according to still another exemplary embodiment.

FIG. 7 is a block diagram of an image device according to another exemplary embodiment. Hereinafter, duplicate explanation of the above-described embodiments will be omitted, and explanation will be made around different points between this embodiment and the above-described embodiments.

Referring to FIG. 7, an image device 4 according to this embodiment may further include an output module 50.

The output module 50 may store first and second sub-data SD1_P3 and SD2_P3, on which third image processing has been performed, in a frame buffer 52, and output the stored data to an output panel (e.g., liquid crystal display (LCD) panel or organic light emitting diode (OLED) panel).

As illustrated, in a case where an image sensor 32 senses an object and generates image data ID, an image that the output module 50 outputs to the output panel may be a preview that is obtained by performing first to third image processing with respect to the object image.

The image device 4 may be included in a digital camera, a smart phone, or a tablet, but the inventive concept is not limited to such examples.

Next, referring to FIG. 8, an image device according to still another exemplary embodiment will be described.

Figure 8:
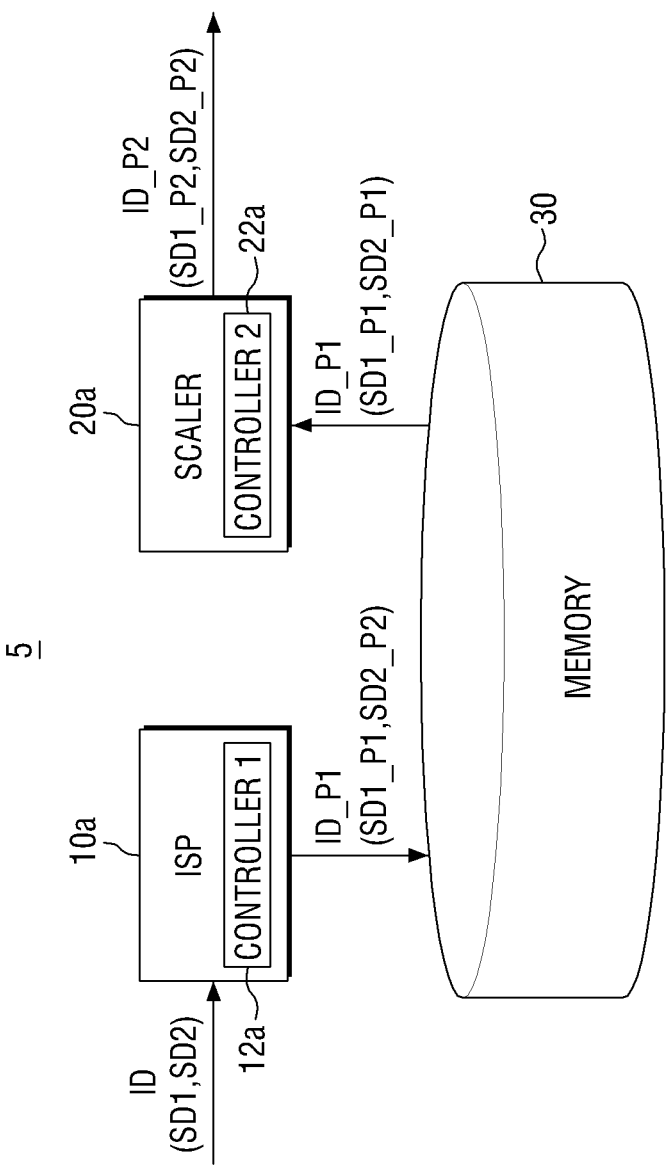
FIG. 8 is a block diagram of an image device according to still another exemplary embodiment.

FIG. 8 is a block diagram of an image device according to still another exemplary embodiment. Hereinafter, duplicate explanation of the above-described embodiments will be omitted, and explanation will be made around different points between this embodiment and the above-described embodiments.

Referring to FIG. 8, an image device 5 according to this embodiment may include an image signal processor (ISP) 10a and a scaler 20a.

The ISP 10a may perform first image processing that includes gain correction, white balance adjustment, and noise correction of the image data ID, and then write a result ID_P1 in the memory 30.

As described above, in a case where the image data ID includes first and second sub-data SD1 and SD2, the first and second sub-data SD1 and SD2 may be sequentially processed by the ISP 10a.

The scaler 20a may perform second image processing to adjust a size of the image data ID_P1 on which the first image processing has been performed. In the same manner, in a case where the image data ID_P1, on which the first image processing has been performed, includes first and second sub-data SD1_P1 and SD2_P1, the first and second sub-data SD1_P1 and SD2_P1, on which the first image processing has been performed, may be sequentially processed by the scaler 20a.

In accordance with operations of the first and second controllers 12a and 22a, before the second sub-data SD2_P1, on which the first image processing has been performed, is written in the memory 30 after the first sub-data SD1_P1, on which the first image processing has been performed, is written in the memory 30, the scaler 20a may read the first sub-data SD1_P1, on which the first image processing has been performed, from the memory 30. Since this has been fully explained, duplicate explanation thereof will be omitted.

Next, referring to FIG. 9, an image device according to still another exemplary embodiment will be described.

Figure 9:
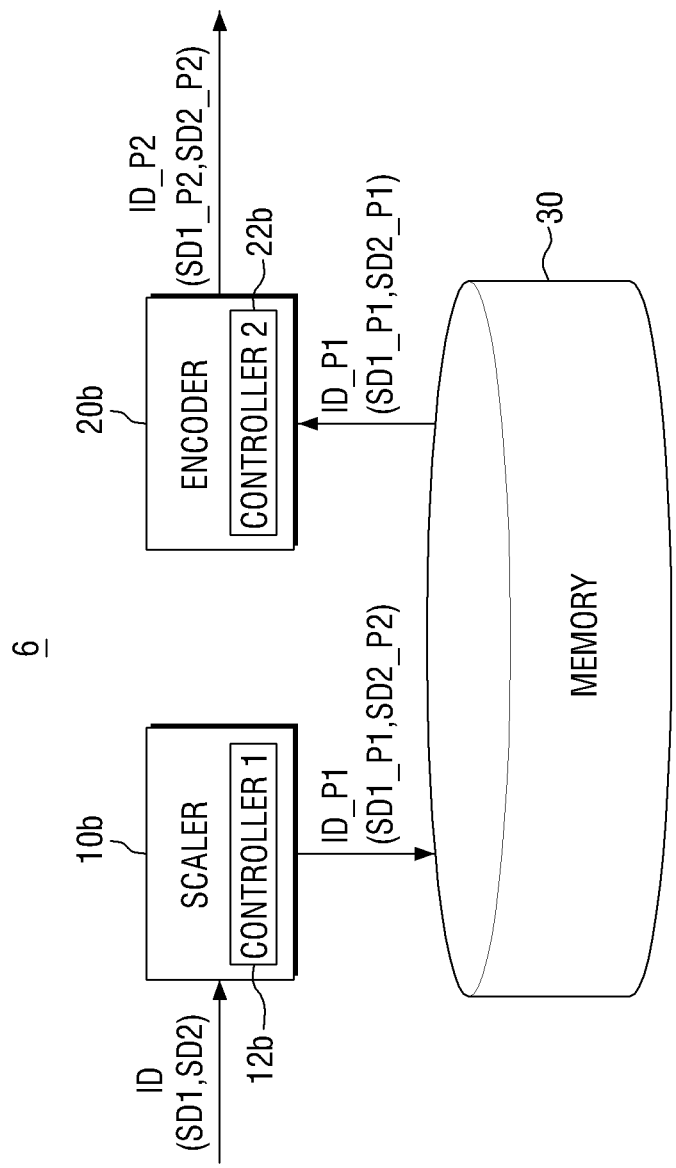
FIG. 9 is a block diagram of an image device according to still another exemplary embodiment.

FIG. 9 is a block diagram of an image device according to still another exemplary embodiment. Hereinafter, duplicate explanation of the above-described embodiments will be omitted, and explanation will be made around different points between this embodiment and the above-described embodiments.

Referring to FIG. 9, an image device 6 according to this embodiment may include a scaler 10b and an encoder 20b.

The scaler 10b may perform first image processing to adjust a size of image data ID, and then write a result ID_P1 in the memory 30.

As described above, in a case where the image data ID includes first and second sub-data SD1 and SD2, the first and second sub-data SD1 and SD2 may be sequentially processed by the scaler 10b.

The encoder 20b may perform second image processing to change an image data type from a first type to a second type with respect to the image data ID_P1 on which the first image processing has been performed. In the same manner, in a case where the image data ID_P1, on which the first image processing has been performed, includes first and second sub-data SD1_P1 and SD2_P1, the first and second sub-data SD1_P1 and SD2_P1, on which the first image processing has been performed, may be sequentially processed by the encoder 20b.

In accordance with operations of the first and second controllers 12b and 22b, before the second sub-data SD2_P1, on which the first image processing has been performed, is written in the memory 30 after the first sub-data SD1_P1, on which the first image processing has been performed, is written in the memory 30, the encoder 20b may read the first sub-data SD1_P1, on which the first image processing has been performed, from the memory 30. Since this has been fully explained, the duplicate explanation thereof will be omitted.

Next, referring to FIG. 10, an image device according to still another exemplary embodiment will be described.

Figure 10:
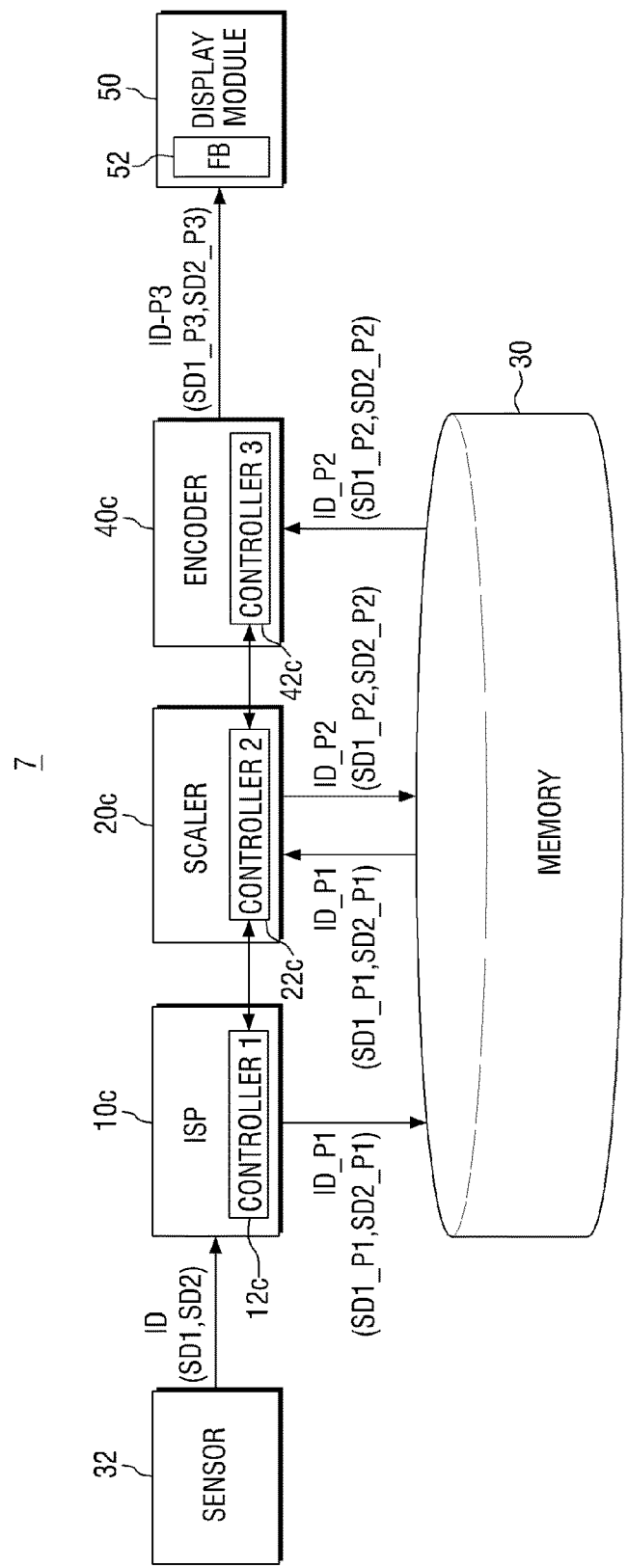
FIG. 10 is a block diagram of an image device according to still another exemplary embodiment.

FIG. 10 is a block diagram of an image device according to still another exemplary embodiment. Hereinafter, duplicate explanation of the above-described embodiments will be omitted, and explanation will be made around different points between this embodiment and the above-described embodiments.

Referring to FIG. 10, an image device 7 according to this embodiment may include a memory 30, an image sensor 32, an ISP 10c, a scaler 20c, an encoder 40c, and an output module 50.

The image sensor 32 may sense an image of an object and generate image data ID. In this case, first sub-data SD1 may be data of an n-th (where, n is a natural number) column pixel group of the sensed image data ID, and second sub-data SD2 may be data of an (n+1)-th column pixel group of the sensed image data ID.

The ISP 10c may perform first image processing that includes gain correction, white balance adjustment, and noise correction of the image data ID, and then write a result ID_P1 in the memory 30.

The scaler 20c may read the image data ID_P1, on which the first image processing has been performed, from the memory, perform second image processing to adjust a size of the image data, and then write a result ID_P2 in the memory 30.

The encoder 40c may read the image data ID_P2, on which the second image processing has been performed, from the memory 30, perform third image processing to change an image data type from a first type to a second type, and then provide processed image data to the output module 50.

The output module 50 may store the first and second sub-data SD1_P3 and SD2_P3, on which the third image processing has been performed, in the frame buffer 52, and output stored data to an output panel (e.g., LCD panel or OLED panel) in a form of a preview of the image data ID.

Next, referring to FIG. 11, an image device according to still another exemplary embodiment will be described.

Figure 11:
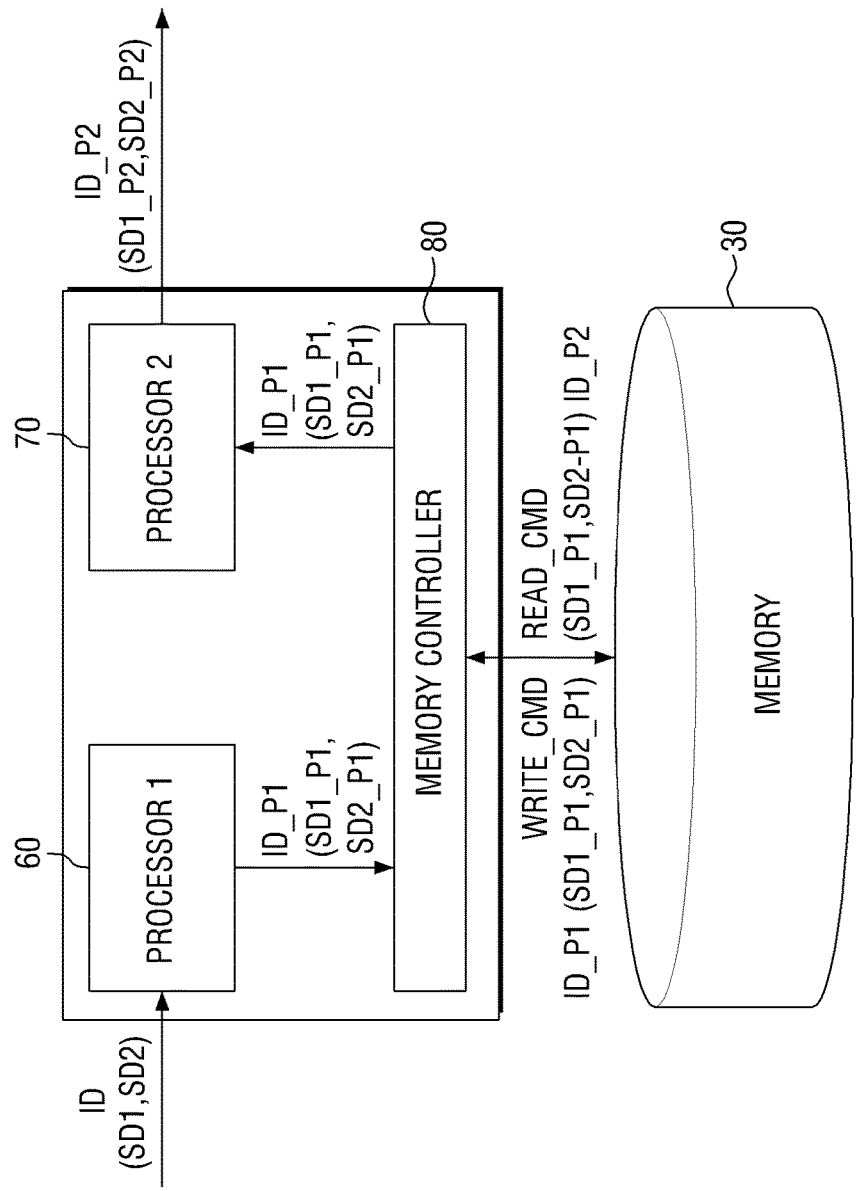
FIG. 11 is a block diagram of an image device according to still another exemplary embodiment.

FIG. 11 is a block diagram of an image device according to still another exemplary embodiment. Hereinafter, duplicate explanation of the above-described embodiments will be omitted, and explanation will be made around different points between this embodiment and the above-described embodiments.

Referring to FIG. 11, an image device 8 according to this embodiment may include a memory controller 80.

As illustrated, the memory controller 80 may be arranged in one chip together with first and second image processors 60 and 70, or may be arranged outside the first and second image processors 60 and 70.

The memory controller 80 may control the memory 30 through a memory bus. Specifically, the memory controller 80 may provide a write command WRITE_CMD to the memory bus to write an output of the first image processor 60 in the memory 30, and may provide a read command READ_CMD to the memory bus to provide the output of the first image processor 60, which is stored in the memory 30, to the second image processor 70.

Operations of the memory controller 80 will be described.

First, if the first image processor 60 completes first image processing with respect to first sub-data SD1, the memory controller 80 provides the write command WRITE_CMD for writing the first sub-data SD1_P1, on which the first image processing has been performed, in the memory 30 to the memory bus.

Next, if a command indicating that the first sub-data SD1_P1, on which the first image processing has been performed, is received from the memory 30, the memory controller 80 provides the read command READ_CMD to the memory bus to provide the first sub-data SD1_P1, on which the first image processing has been performed, to the second image processor 70.

Next, if the first sub-data SD1_P1, on which the first image processing has been performed, is provided from the memory 30, it is provided to the second image processor 70. The second image processor 70 may perform second image processing with respect to the first sub-data SD1_P1 on which the first image processing has been performed.

Next, if the first image processor 60 completes the first image processing with respect to the second sub-data SD2, the memory controller 80 provides the write command WRITE_CMD for writing the second sub-data SD2_P1, on which the first image processing has been performed, in the memory 30 to the memory bus.

Next, if a command indicating that the second sub-data SD2_P1, on which the first image processing has been performed, is received from the memory 30, the memory controller 80 provides the read command READ_CMD to the memory bus to provide the second sub-data SD2_P1, on which the first image processing has been performed, to the second image processor 70.

Next, if the second sub-data SD2_P1, on which the first image processing has been performed, is provided from the memory 30, it is provided to the second image processor 70. The second image processor 70 may perform the second image processing with respect to the second sub-data SD2_P1 on which the first image processing has been performed.

In this embodiment, the memory controller 80 provides the read command READ_CMD for reading the second sub-data SD1_P1, on which the first image processing has been performed, from the memory 30 to the memory bus before providing the write command WRITE_CMD for writing the second sub-data SD2_P1, on which the first image processing has been performed, in the memory 30. Accordingly, while the first image processor 60 performs the first image processing with respect to the second sub-data SD2, the second image processor 70 may perform the second image processing with respect to the first sub-data SD1_P1 on which the first image processing has been performed.

Figure 12:
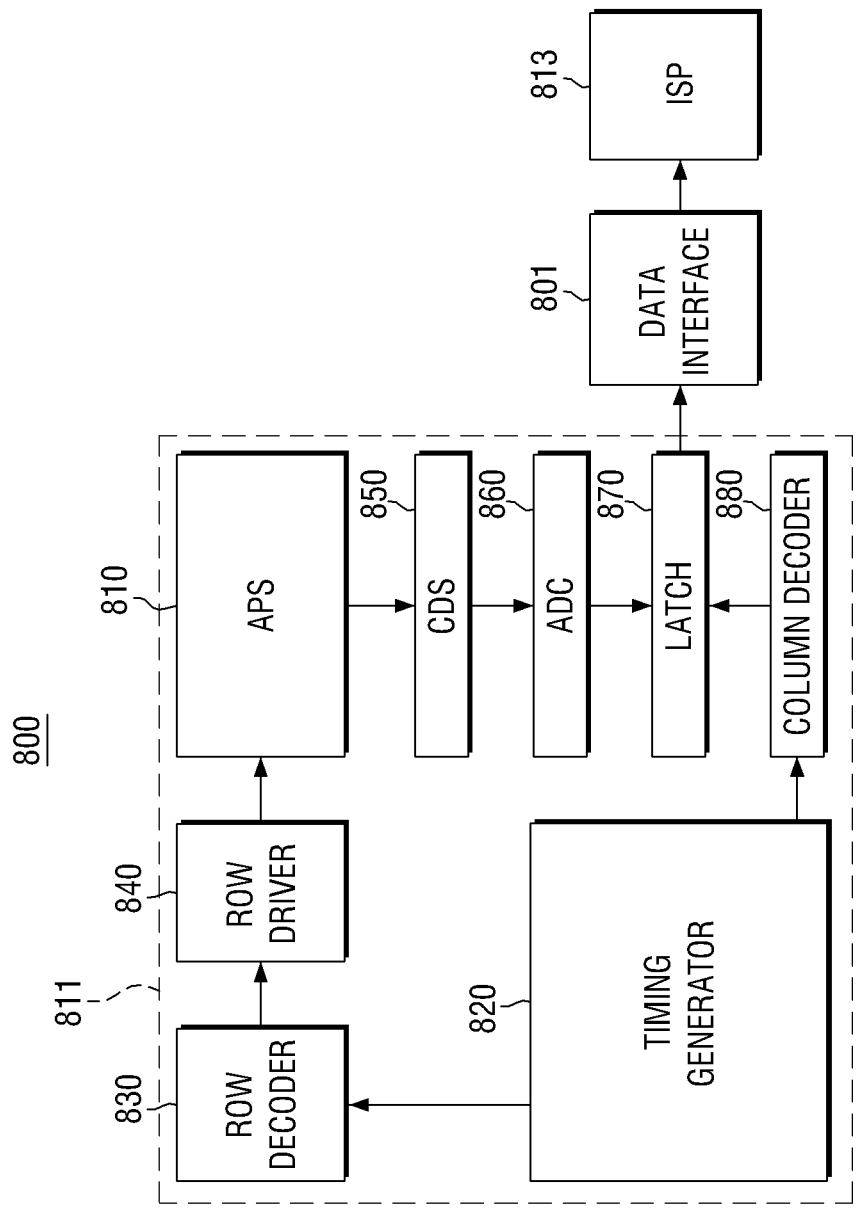
FIG. 12 is a block diagram of an image device according to still another exemplary embodiment.

FIG. 12 is a block diagram of an image device according to still another exemplary embodiment.

Referring to FIG. 12, an image device 800 may include an image sensor 811 and an ISP 813. Here, the image sensor 811 may correspond to the image sensor (e.g., 32 in FIG. 10) as described above, and the ISP 813 may correspond to the ISP (e.g., 10c in FIG. 10). However, the present disclosure is not limited thereto.

The image sensor 811 may include an active pixel sensor (APS) array 810 in which pixels that include photoelectric conversion elements are two-dimensionally arranged, a timing generator 820, a row decoder 810, a row driver 840, a correlated double sampler (CDS) 850, an analog-to-digital converter (ADC) 860, a latch 870, and a column decoder 880.

The APS array 810 may include a plurality of unit pixels that are two-dimensionally arranged. The plurality of unit pixels may serve to convert an optical image into an electrical output signal. The APS array 810 may receive a plurality of driving signals, such as a row selection signal, a reset signal, and a charge transfer signal, from the row driver 840 to be driven. Further, the converted electrical output signal may be provided to the CDS 850 through vertical signal lines.

In some exemplary embodiments, the APS array 810 may include complementary metal oxide semiconductor (CMOS) type image pixels. Although not clearly illustrated in the drawing, pixels arranged in the APS array 810 may be arranged in a form of a Bayer pattern or chess mosaic. In a case of adopting Bayer pattern technology, the pixels in the active APS array 810 may be arranged to receive red light, green light, and blue light. However, the inventive concept is not limited thereto, but a configuration of the plurality of active pixels arranged in the APS array 810 may be modified without limit.

For example, in some exemplary embodiments, the plurality of active pixels arranged in the APS array 810 may be arranged to receive magenta (Mg) light, yellow (Y) light, cyan (Cy) light and/or white (W) light.

The timing generator 820 may provide a timing signal and a control signal to the row decoder 830 and the column decoder 880.

The row driver 840 may provide a plurality of driving signals for driving the plurality of unit pixels to the APS array 810. In general, in a case where the unit pixels are arranged in a matrix form, the row driver 840 may provide the driving signals by rows.

The CDS 850 may receive output signals formed in the APS array 810 through the vertical signal lines to hold and sample the received output signals. That is, the CDS 850 may output a difference level that corresponds to a difference between a noise level and a signal level through double sampling of a specific noise level and the signal level of the output signals.

The ADC 860 may convert an analog signal that corresponds to the difference level into a digital signal to output the converted digital signal.

The latch 870 may latch the digital signal and sequentially transmit the latched signals to the ISP 813 according to a result of decoding performed by the column decider 880.

The ISP 813 may perform gain correction of the light quantity or adjustment of white balance with respect to the electrical signal output from the image sensor 811. The ISP 813 may receive exposure data (i.e., image signal) of a captured image and remove noise included in the received image signal through correction.

A data interface 801 is positioned in the middle between the image sensor 811 and the ISP 813, and may transfer the first and second sub-data (e.g., SD1 and SD2 in FIG. 10), which are transferred from the image sensor 811, to the ISP 813.

Figure 13:
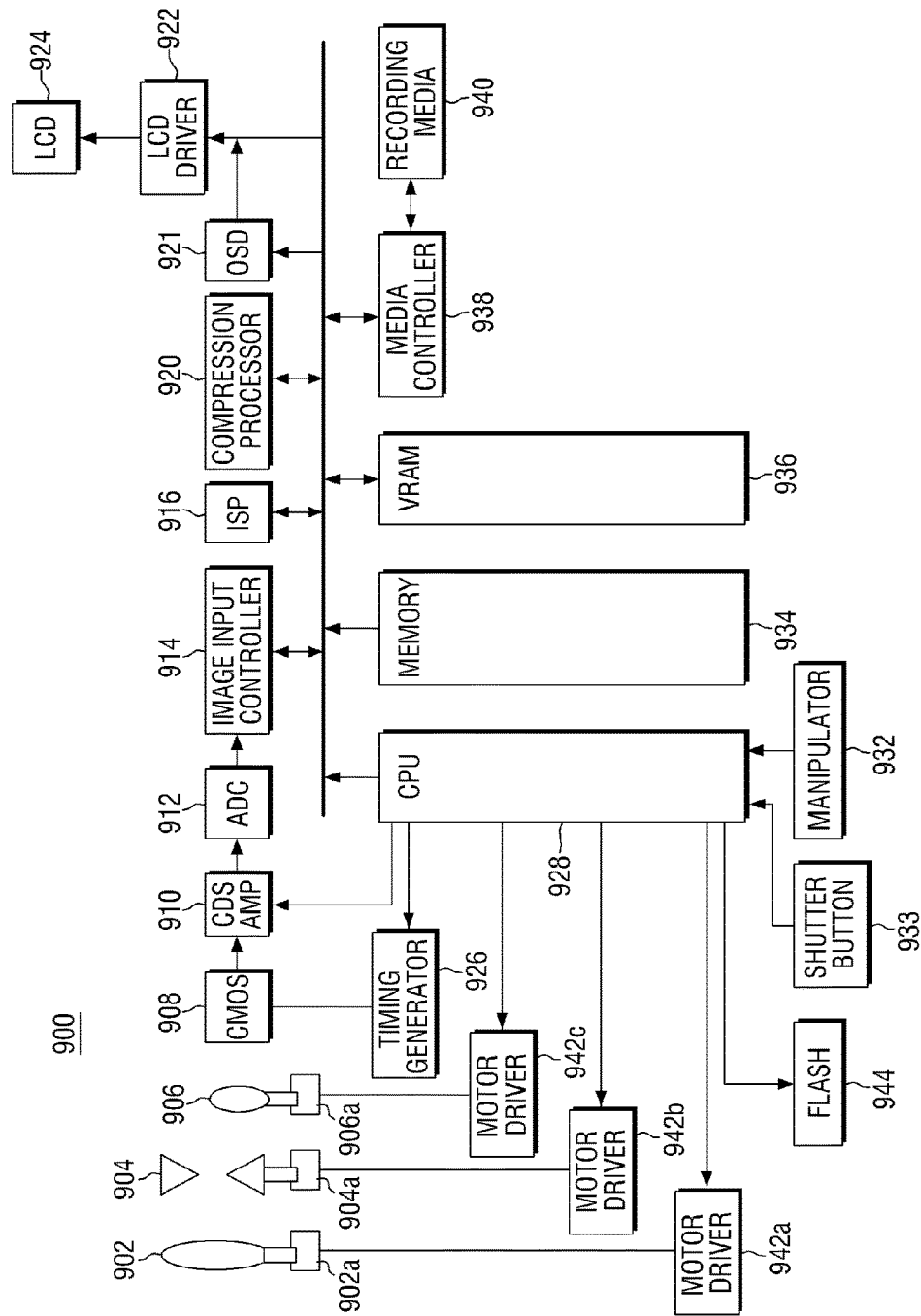
FIG. 13 is a block diagram of an image device according to still another exemplary embodiment.

FIG. 13 is a block diagram of an image device according to still another exemplary embodiment.

Referring to FIG. 13, an image device 900 according to this embodiment may include a zoom lens 902, an iris 904, a focus lens 906, driving devices 902a, 904a, and 906a, a CMOS device 908, an amplifier-integrated CDS circuit 910, an ADC 912, an image input controller 914, an ISP 916, a compression processor 920, an on screen display (OSD) 921, an LCD driver 922, an LCD 924, a timing generator 926, a central processing unit (CPU) 928, an operation unit 932, a shutter button 933, a memory 934, a video random access memory (VRAM) 936, a media controller 938, a recording media 940, motor drivers 942a, 942b, and 942c, and a flash 944.

The zoom lens 902 is a lens that is moved forward/backward in an optical axis direction by the driving device 902a to continuously change a focal distance thereof, and captures an image of an object with its size changed. The iris 904 is driven by the driving device 904a to adjust a quantity of light that comes into the CMOS device 908 when an image is captured. The focus lens 906 is moved forward/backward in an optical axis direction by the driving device 906a to adjust a pint of the object.

FIG. 13 illustrates only one zoom lens 902 and one focus lens 906, but the inventive concept is not limited thereto. The number of zoom lenses 902 may be two or more, and the number of focus lenses 906 may also be two or more.

The CMOS device 908 is a device that converts light incident from the zoom lens 902, the iris 904, and the focus lens 906 into an electrical signal. In this embodiment, the CMOS device 908 adjusts time for which the electrical signal is extracted through control of the incident light by an electronic shutter, and may adjust a time for which the electrical signal is extracted through control of the incident light using a mechanical shutter.

In some exemplary embodiments, the zoom lens 902, the iris 904, the focus lens 906, and the CCD device 910 may constitute an imaging unit. Further, a set of the imaging unit is not limited thereto, and may not include the zoom lens 902 or the iris 904.

In some exemplary embodiments, the CMOS device 908 is used, and the CDS circuit 910 may be a circuit in which a CDS circuit, which is a kind of a sampling circuit to remove noise of the electrical signal output from the CMOS device 908, and an amplifier, which amplifies the electrical signal after the noise is removed, are integrally provided.

However, the inventive concept is not limited thereto. In this embodiment, the image device 900 is configured using a circuit in which the CDS circuit and the amplifier are integrally provided. However, the CDS circuit and the amplifier may be configured as separate circuits.

The ADC 912 may convert the electrical signal generated from the CMOS device 908 into a digital signal and generate raw data of the image.

The image input controller 914 may control an input of the raw data of the image generated by the ADC to the memory 934.

The ISP 916 may perform gain correction of the light quantity or adjustment of the white balance with respect to the electrical signal output from the CMOS device 908. The ISP 916 acquires exposure data of the captured image. The exposure data may include an auto focus (AF) evaluation value or an auto exposure (AE) evaluation value. The ISP 916 may calculate the AF evaluation value or the AE evaluation value.

The compression processor 920 may perform compression processing that compresses an image that is developed by the ISP 916 to image data of an appropriate type. The image compression type may include a reversible type and a non-reversible type. As an example of an appropriate type, the image can be converted in a joint photographic experts group (JPEG) type or JPEG 2000 type.

The OSD 921 may display a setting screen of the image device 900 on the LCD 924. The LCD 924 may display a live view before performing an image capturing operation, various kinds of setting screens of the image device 900, or a captured image. However, the inventive concept is not limited thereto. The display of the image data or various kinds of information of the image device 900 may be performed through the LCD driver 922.

The timing generator 926 may input a timing signal to the CMOS device 908. The shutter speed is determined by the timing signal from the timing generator 926. That is, the operation of the CMOS device 908 is controlled by the timing signal from the timing generator 926, and the electrical signal that is the basis of the image data may be generated as the image light from the object is incident to the CMOS device 908 within the driving time of the CMOS device 908.

The CPU 928 may execute a command of a signal system or a command of an operation system through the operation of the operation unit 932 with respect to the CMOS device 908 or the CDS circuit 910. In this embodiment, only one CPU is included, but the commands of the signal system or the operation system may be executed by a separate CPU.

The operation unit 932 may have a member arranged thereon to perform an operation of the image device 900 or various kinds of settings during the image capturing. As the member arranged on the operation unit 932, a power button (not illustrated), a cross key (not illustrated) that performs selection of an image capturing mode or image capturing drive mode and setting of a soft focus effect, and a selection button (not illustrated) may be arranged. The shutter button 933 is to perform an image capturing operation. The shutter button 933 may focus on an object in a semi-press state, and capture an image of the object in a full-press state.

The memory 934 is an example of the image storage that temporarily stores a captured image or an image synthesized by the image synthesizer 918. The memory 934 may have a storage capacity enough to store a plurality of images. The read/write of an image through the memory 934 may be controlled by an image input controller 914.

The VRAM 936 maintains the contents displayed on the LCD 924, and the resolution or the maximum number of color formations of the LCD 924 depends on the capacity of the VRAM 936.

The recording media 940 is an example of an image recording portion on which captured images can be recorded. The input/output through the recording media 940 may be controlled by the media controller 938. As the recording media 940, a memory card that is a card type storage device in which data is recorded in a flash memory may be used.

The motor drivers 942a, 942b, and 942c may control the driving devices 902a, 904a, and 906a that operate the zoom lens 902, the iris 904, and the focus lens 906. By operating the zoom lens 902, the iris 904, and the focus lens 906 using the motor drivers 942a, 942b, and 942c, the size of an object, the quantity of light, and the pint can be adjusted.

The flash 944 may brightly flash on the object during image capturing outdoors at night or in a dark place. During capturing a flash image, the CPU 928 sends a light emission command to a flash device 944, and the flash 944 emits light according to the light emission command from the CPU 928 to brightly flash on the object.

The image device 900 may correspond to at least one of the image devices 1 to 8 according to the above-described embodiments. For example, the CMOS device 908 may corresponds to the image sensor 32 of the image devices 1 to 8 as described above, and the ISP 916 and the compression processor 920 may correspond to the image processors 10 and 20 of the image devices 1 to 8 as described above. The LCD 924 may correspond to the output module 50 of the image devices 1 to 8, and the memory 934 may correspond to the memory 30 of the image devices 1 to 8.

Figure 14:
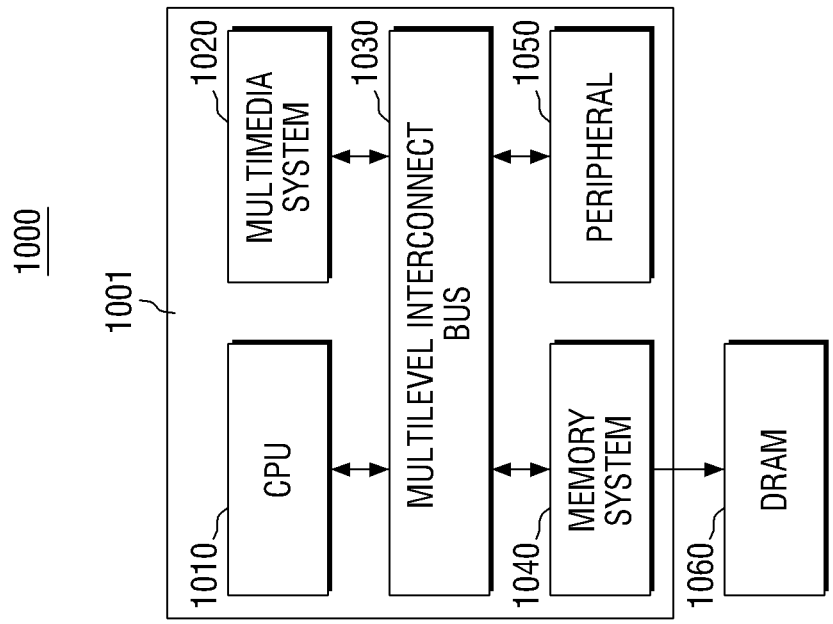
FIG. 14 is a block diagram of a system on chip (SoC) system that includes an image device according to an exemplary embodiment.

FIG. 14 is a block diagram of a system-on-chip (SoC) system that includes an image device according to an exemplary embodiment.

Referring to FIG. 14, a SoC system 1000 may include an application processor 1001 and a DRAM 1060.

The application processor 1001 may include a CPU 1010, a multimedia system 1020, a bus 1030, a memory system 1040, and a peripheral circuit 1050.

The CPU 1010 may perform an operation that is required to drive the SoC system 1000. In some embodiments, the CPU 1010 may be configured in a multi-core environment including a plurality of cores.

The multimedia system 1020 may be used to perform various kinds of multimedia functions in the SoC system 1000. The multimedia system 1020 may include a three-dimensional (3D) engine module, a video codec, a display system, a camera system, and a post-processor. According to the embodiments as described above, the image sensor 32 and the first to third image processors 10, 20, and 30 of the image devices 1 to 8 may be adopted as constituent elements of the multimedia system 1020.

A bus 1030 may be used for the CPU 1010, the multimedia system 1020, the memory system 1040, and the peripheral circuit 1050 to perform data communication with each other. In some exemplary embodiments, the bus 1030 may have a multilayer structure. Specifically, the bus 1030 may be a multilayer advanced high-performance bus (AHB) or a multilayer advanced eXtensible interface (AXI), but the inventive concept is not limited thereto.

The memory system 1040 may provide a necessary environment in which the application processor 1001 is connected to an external memory (e.g., DRAM 1060) to perform high-speed operation. In some exemplary embodiments, the memory system 104 may include a separate controller (e.g., DRAM controller) for controlling the external memory (e.g., DRAM 1060).

The peripheral circuit 1050 may provide a necessary environment in which the SoC system 1000 is smoothly connected to an external device (for example, main board). Accordingly, the peripheral circuit 1050 may include various interfaces that can make the external device compatible with the SoC system 1000.

The DRAM 1060 may function as an operating memory that is required for the operation of the application processor 1001. In some exemplary embodiments, the DRAM 1060 may be arranged outside the application processor 1001. Specifically, the DRAM 1060 may be packaged in a package on package (PoP) form with the application processor 110 as illustrated in FIG. 22. In some exemplary embodiments as described above, the memory of the image devices 1 to 8 may correspond to the DRAM 1060.

Figure 15:
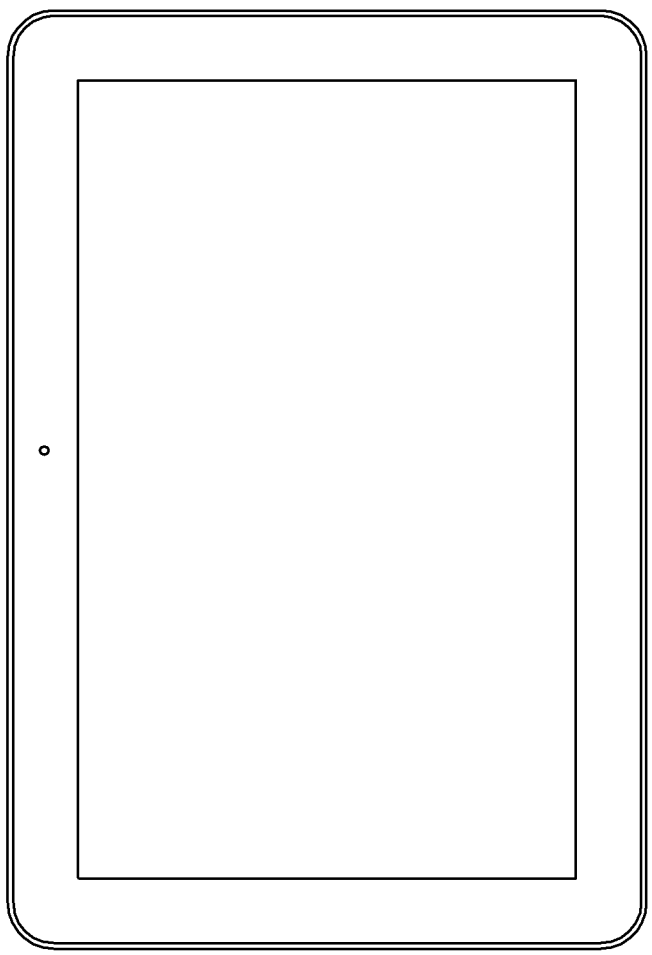
FIGS. 15 to 17 are exemplary views illustrating semiconductor systems to which an image device according to some exemplary embodiments can be applied.
Figure 16:
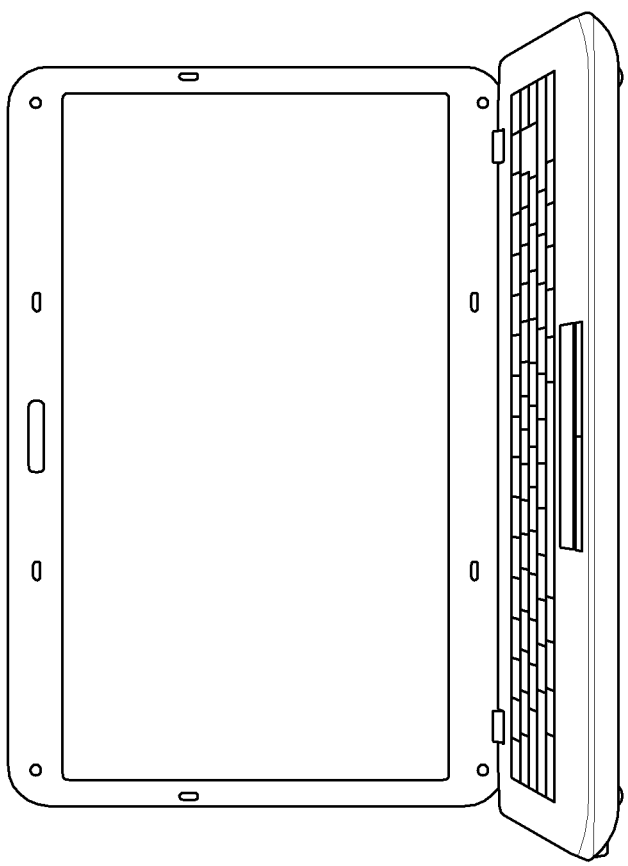
Figure 17:
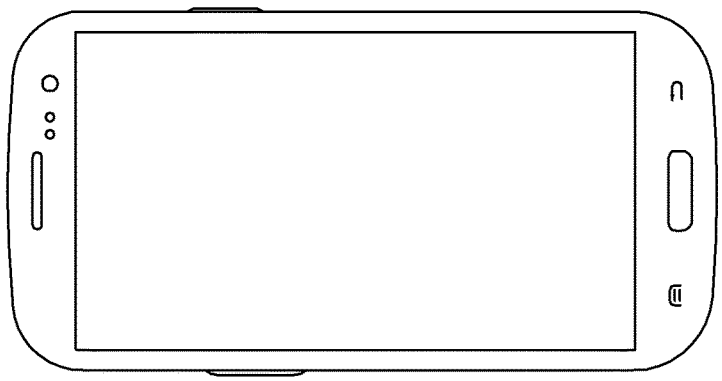

FIGS. 15 to 17 are views of exemplary semiconductor systems to which the semiconductor device according to some exemplary embodiments can be applied.

FIG. 15 illustrates a tablet personal computer (PC) 1200, FIG. 16 illustrates a notebook computer 1300, and FIG. 17 illustrates a smart phone 1400. At least one of the image devices 1 to 8, 800, and 900 or the SoC system 1000 including the same according to the embodiments may be used in the tablet PC 1200, the notebook computer 1300, or the smart phone 1400.

Further, it is apparent to those of skilled in the art that the semiconductor device according to some exemplary embodiments can be applied even to other integrated circuit devices that have not been exemplified. That is, although the tablet PC 1200, the notebook computer 1300, and the smart phone 1400 have been indicated as examples of the semiconductor system according to this embodiment, the examples of the semiconductor system according to this embodiment are not limited thereto. In some exemplary embodiments, the semiconductor system may be implemented as a computer, ultra mobile PC (UMPC), workstation, net-book, personal digital assistant (PDA), portable computer, wireless phone, mobile phone, e-book, portable multimedia player (PMP), portable game machine, navigation device, black box, digital camera, 3D television set, digital audio recorder, digital audio player, digital picture recorder, digital picture player, digital video recorder, or digital video player.

Although exemplary embodiments have been described for illustrative purposes, those skilled in the art will appreciate that various modifications, additions and substitutions are possible, without departing from the scope and spirit of the inventive concept as disclosed in the accompanying claims.

What is claimed is:

1. An image device comprising:
a memory;
a first image processor configured to receive image data that comprises first and second sub-data, perform first image processing, and write a result of the first image processing to the memory;
a second image processor configured to read the first and second sub-data, on which the first image processing has been performed, from the memory, and perform second image processing that is different from the first image processing; and
a first controller arranged inside the first image processor comprises a first counter configured to increment for a time period when the first sub-data, on which the first image processing has been performed, is written to the memory, and
a second controller arranged inside the second image processor comprises a receiver configured to receive a value from the first counter when the first sub-data, on which the first image processing has been performed, is written to the memory.

2. The image device of claim 1, wherein the first sub-data comprises first pixel group data in an image frame, and the second sub-data includes second pixel group data in the image frame that is different from the first pixel group data.

3. The image device of claim 2, wherein the first pixel group data comprises pixel group data arranged in a first row of the image frame that is sensed by an image sensor, and the second pixel group data comprises pixel group data arranged in a second row that is arranged on a lower portion of the first row in the image frame.

4. The image device of claim 1, further comprising a memory controller configured to control the memory through a memory bus.

5. The image device of claim 1, further comprising an image sensor configured to sense an image and generate the image data.

6. The image device of claim 5, further comprising an output module configured to store the first and second sub-data, on which the second image processing has been performed, in a frame buffer and output a preview of the image based on the stored first and second sub-data.

7. The image device of claim 1, further comprising a third image processor configured to read the first and second sub-data, on which the second image processing has been performed, from the memory, and perform third image processing that is different from the second image processing.

8. The image device of claim 7, wherein the first image processor includes an image signal processor configured to perform image processing comprising at least one of gain correction of the image data, white balance adjustment, and noise correction,
wherein the second image processor comprises a scaler configured to adjust a size of the image data, and
wherein the third image processor comprises an encoder configured to convert the image data from a first type into a second type.

9. An image device comprising:
a memory;
an image sensor configured to sense an image;
a first image processor configured to receive image data of the image that comprises first and second sub-data, perform first image processing with respect to a part of the received image, and write a result of the first image processing to the memory;
a second image processor configured to receive the result written in the memory, and perform second image processing that is different from the first image processing while the first image processor performs the first image processing with respect to a remaining part of the received image; and
an output module configured to output a result of the second image processing.

10. The image device of claim 9, further comprising:
a counter configured to increase a count value whenever the first image processor performs the first image processing; and
a comparator configured to generate an output signal so that the second image processor performs the second image processing if the count value of the counter becomes a predetermined value.

11. The image device of claim 10, wherein the counter comprises first and second counters,
wherein the first counter is arranged inside the first image processor to increase a count value whenever the first image processor performs the first image processing,
wherein the second counter is arranged inside the second image processor to increase a count value in the same manner whenever the first counter increases the count value, and
wherein the comparator is arranged inside the second image processor to generate an output signal so that the second image processor performs the second image processing if the count value of the second counter becomes a predetermined value.

12. The image device of claim 9, further comprising a memory controller configured to control an operation of the memory,
wherein the memory controller configured to apply a read command for the result of the first image processing to the memory while the first image processor performs the first image processing with respect to the remaining part of the sensed image.

13. The image device of claim 9, further comprising an output module configured to store the first and second sub-data, on which the second image processing has been performed, in a frame buffer and output a preview of the image based on the stored first and second sub-data,
wherein the first and second image processors are arranged in an application processor.

14. A method for operating an image device, the method comprising:
providing image data comprising first and second sub-data;
performing first image processing with respect to the first sub-data;
writing the first sub-data, on which the first image processing has been performed, to a memory; and
performing second image processing, that is different from the first image processing, through reading of the first sub-data, on which the first image processing has been performed, from the memory while the first image processing is performed with respect to the second sub-data, receiving a value when the first sub-data, on which the first image processing has been performed, is written to the memory.

15. The method of claim 14, wherein the reading the first sub-data, on which the first image processing has been performed, from the memory comprises sensing that the first sub-data, on which the first image processing has been performed, is written to the memory and reading the first sub-data on which the first image processing has been performed.

16. The method of claim 14, further comprising:

writing the first sub-data, on which the second image processing has been performed, to the memory; and performing third image processing, that is different from the second image processing, through reading of the first sub-data, on which the second image processing has been performed, from the memory while the second image processing is performed with respect to the second sub-data.

17. The method of claim 14, further comprising outputting the first sub-data, on which the second image processing has been performed, to a panel in a preview form.

* * * * *